(12) United States Patent
Negroponte

(10) Patent No.: US 9,237,383 B2
(45) Date of Patent: Jan. 12, 2016

(54) PEER TO PEER STREAMING OF DVR BUFFERED PROGRAM DATA

(75) Inventor: Dimitri Negroponte, Los Angeles, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/819,265

(22) PCT Filed: Aug. 25, 2011

(86) PCT No.: PCT/US2011/049201
§ 371 (c)(1),
(2), (4) Date: Feb. 26, 2013

(87) PCT Pub. No.: WO2012/027598
PCT Pub. Date: Mar. 1, 2012

(65) Prior Publication Data
US 2013/0152148 A1    Jun. 13, 2013

Related U.S. Application Data

(60) Provisional application No. 61/377,588, filed on Aug. 27, 2010.

(51) Int. Cl.
*H04N 7/173* (2011.01)
*H04N 21/63* (2011.01)
(Continued)

(52) U.S. Cl.
CPC ............... *H04N 21/632* (2013.01); *G01S 5/20* (2013.01); *G06F 3/017* (2013.01); *G06F 3/0346* (2013.01); *G06F 3/0383* (2013.01); *G06F 3/048* (2013.01); *G06F 3/0481* (2013.01); *G06F 3/0482* (2013.01); *G06F 3/0485* (2013.01); *G06K 9/3266* (2013.01); *G06N 5/02* (2013.01); *G06Q 30/0201* (2013.01); *G08C 17/00* (2013.01); *G08C 17/02* (2013.01); *G08C 19/00* (2013.01); *H04L 65/403* (2013.01); *H04N 5/4403* (2013.01); *H04N 5/44504* (2013.01);
(Continued)

(58) Field of Classification Search
CPC . H04N 21/63; H04N 21/632; H04N 21/4147; H04N 21/437
USPC .................. 725/58, 86, 98, 109, 110
See application file for complete search history.

(56) References Cited

U.S. PATENT DOCUMENTS

| 6,745,212 | B2 | 6/2004 | Kishi et al. |
| 2002/0068558 | A1* | 6/2002 | Janik .............................. 455/422 |

(Continued)

FOREIGN PATENT DOCUMENTS

| KR | 10-2008-0022857 | 3/2008 |
| WO | 2008051681 | 5/2008 |

OTHER PUBLICATIONS

International Search Report and Written Opinion received for PCT Patent Application No. PCT/US2011/049201, mailed Feb. 29, 2012, 11 pages.

*Primary Examiner* — Jeremy Duffield
(74) *Attorney, Agent, or Firm* — Kacvinsky Daisak Bluni PLLC

(57) ABSTRACT

Various embodiments are directed to streaming DVR devices that can communicate over an Internet Protocol (IP) network with other streaming enabled DVR devices. Implementing a peer-to-peer type connection, one streaming enabled DVR device may be able to stream buffered video data to another streaming enable DVR device. Other embodiments are described and claimed.

16 Claims, 9 Drawing Sheets

(51) Int. Cl.
| | |
|---|---|
| *H04N 21/437* | (2011.01) |
| *G06K 9/32* | (2006.01) |
| *H04N 5/445* | (2011.01) |
| *H04N 21/431* | (2011.01) |
| *H04N 21/654* | (2011.01) |
| *G08C 17/00* | (2006.01) |
| *G08C 17/02* | (2006.01) |
| *G08C 19/00* | (2006.01) |
| *G06F 3/048* | (2013.01) |
| *G06N 5/02* | (2006.01) |
| *G01S 5/20* | (2006.01) |
| *H04N 21/45* | (2011.01) |
| *H04N 21/488* | (2011.01) |
| *H04N 5/91* | (2006.01) |
| *H04N 5/44* | (2011.01) |
| *G06F 3/0485* | (2013.01) |
| *H04L 29/06* | (2006.01) |
| *G06Q 30/02* | (2012.01) |
| *H04N 21/436* | (2011.01) |
| *H04N 21/422* | (2011.01) |
| *H04N 21/443* | (2011.01) |
| *G06F 3/01* | (2006.01) |
| *G06F 3/038* | (2013.01) |
| *G06F 3/0482* | (2013.01) |
| *G06F 3/0481* | (2013.01) |
| *H04N 21/482* | (2011.01) |
| *G06F 3/0346* | (2013.01) |
| *H04N 21/4147* | (2011.01) |
| *H04N 21/433* | (2011.01) |
| *H04N 21/81* | (2011.01) |
| *H04N 21/475* | (2011.01) |

(52) U.S. Cl.
CPC ............ *H04N 5/91* (2013.01); *H04N 21/4147* (2013.01); *H04N 21/42222* (2013.01); *H04N 21/437* (2013.01); *H04N 21/4312* (2013.01); *H04N 21/4333* (2013.01); *H04N 21/43615* (2013.01); *H04N 21/4432* (2013.01); *H04N 21/4436* (2013.01); *H04N 21/4532* (2013.01); *H04N 21/482* (2013.01); *H04N 21/4882* (2013.01); *H04N 21/63* (2013.01); *H04N 21/654* (2013.01); *G08C 2201/32* (2013.01); *H04N 21/4755* (2013.01); *H04N 21/8133* (2013.01); *H04N 2005/44556* (2013.01)

(56) References Cited

U.S. PATENT DOCUMENTS

| | | | |
|---|---|---|---|
| 2007/0009235 A1* | 1/2007 | Walters et al. | 386/112 |
| 2007/0118866 A1* | 5/2007 | Chen | 725/87 |
| 2008/0066112 A1* | 3/2008 | Bailey et al. | 725/58 |
| 2009/0097825 A1 | 4/2009 | Harris | |
| 2009/0102926 A1* | 4/2009 | Bhogal et al. | 348/181 |
| 2009/0300673 A1* | 12/2009 | Bachet et al. | 725/31 |
| 2012/0317225 A1* | 12/2012 | Garg | 709/217 |

* cited by examiner

PEER TO PEER STREAMING OF DVR BUFFERED PROGRAM DATA

RELATED APPLICATIONS

This application claims priority to U.S. Provisional Patent Application Ser. No. 61/377,588 filed Aug. 27, 2010, which is incorporated herein by reference in its entirety.

BACKGROUND

Digital Video Recorders (DVRs) allow users to time-shift television programming, watching content recorded by the DVR at a time of their choosing. Most DVRs continually record at least one broadcast feed that is buffered in memory. Typical buffers can store 30-60 minutes of programming. Viewers can thus "restart" a program from a point in the past. However, this functionality is typically limited to programs that are currently being buffered by the DVR. Accordingly, there may be a need for improved techniques to solve these and other problems.

DETAILED DESCRIPTION

Figure 1:
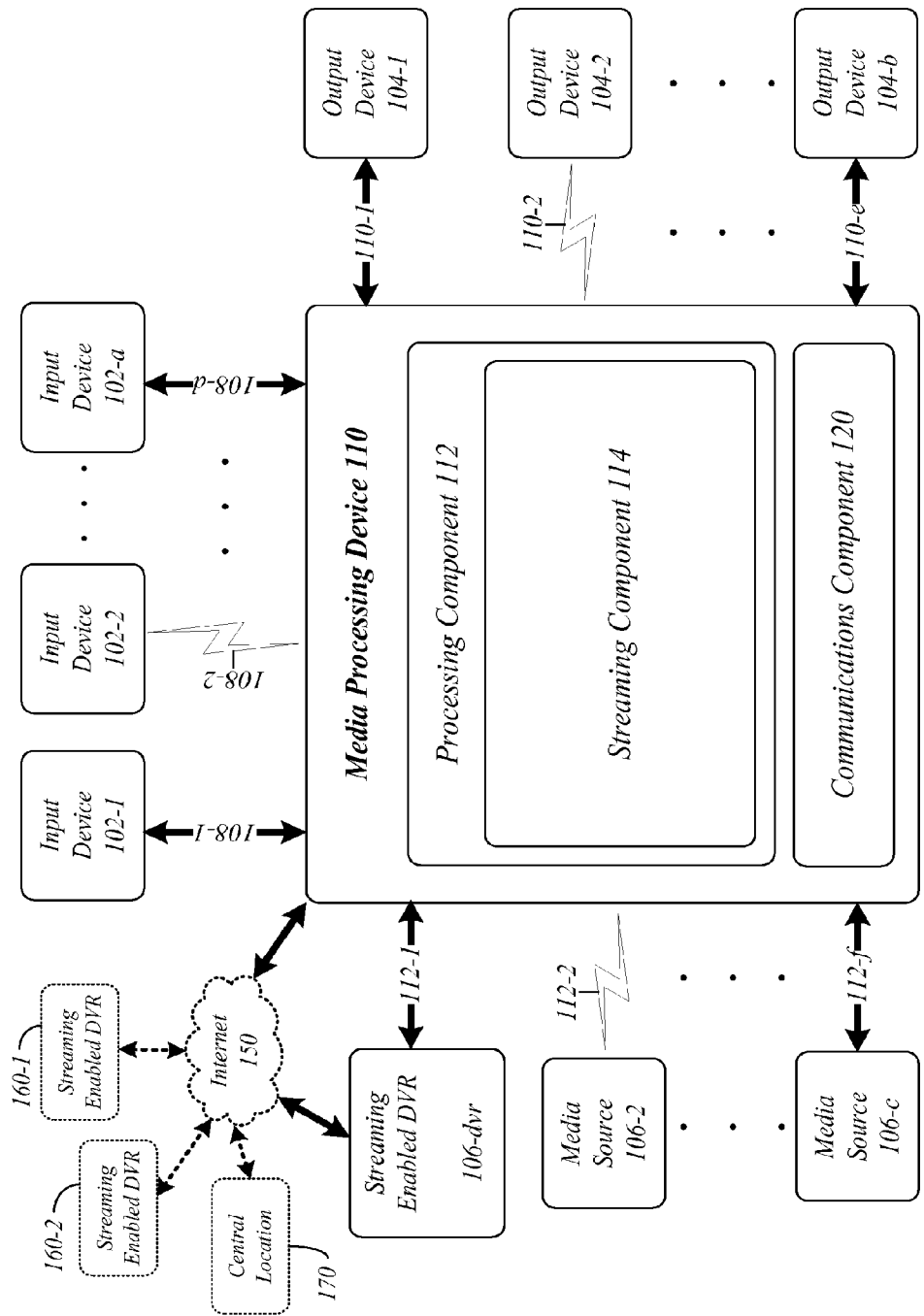
FIG. 1 illustrates one embodiment of a media processing system.

Consumer electronics, processing systems and communications systems are converging. For instance, consumer electronics such as digital televisions and media centers are evolving to include processing capabilities typically found on a computer and communications capabilities typically found in mobile devices. As such, heterogeneous consumer electronics continue to evolve into a single integrated system, sometimes referred to as a "digital home system."

A digital home system may be arranged to provide a compelling entertainment environment in which a user can move seamlessly between television viewing, internet access, and home media management in various embodiments. In some embodiments, a single flexible and dynamic interface may allow a user to find the television programming that they wish to view, acquire the information that they seek from the Web, or enjoy personal audio files, photos, and movies. The system may also facilitate enhanced television viewing, enable collaborative interaction with family and friends, and securely execute financial transactions. A digital home system may provide these features while retaining the familiar design sensibilities and ease-of-use of a traditional television.

In various embodiments, a digital home system may address common deficiencies associated with current entertainment systems in which access to television programming, the internet, and personal media requires operation of three separate interfaces. For example, a unified interface of the digital home system may incorporate physical and graphical elements tied to an easily understood underlying organizational framework, making a home entertainment experience more interesting, compelling, engaging, and efficient. A unified interface may combine the best aspects of the three integrated paradigms, e.g., those of television, internet, and computers. For example, elements such as animation, information-rich displays, and video and audio cues from traditional televisions and television menus may be incorporated into the unified interface. Similarly, seamless integration of different forms of content and communications mechanisms from traditional internet experiences, allowing links from one form of content to another and providing tools such as messaging and video conferencing may also be incorporated. And from computers, point-and-click mechanisms that allow effective navigation of complex information spaces may also be part of the unified interface of the digital home system in various embodiments.

The digital home system may utilize, in some embodiments, a visual display such as a television display as a navigation device. Using the display in combination with any number of remote control devices, a user can carry out complex tasks in fulfilling and transformative ways. The digital home system may include familiar mechanisms such as on-screen programming guides, innovative technologies that facilitate navigation via natural motions and gestures and context-sensitivity that understands the user and the options available to the user which all combine to make the digital home system experience intuitive and efficient as it empowers the user to utilize multiple devices in a seamlessly integrated way.

For a typical television-viewing, media-perusing, and web-browsing home user, the digital home system may be arranged to provide a unified home entertainment experience, allowing the user to freely navigate through television, media, and internet offerings from a traditional viewing position (such as a sofa) using a unified interface. In some embodiments, the unified interface integrates the information provided by a diverse array of devices and services into the existing television or other display in an functionally seamless and easily understood manner.

The digital home system may include, in various embodiments, a multi-axis integrated on-screen navigation allowing the display screen to be used for navigation as well as for the presentation of content. In some embodiments, the digital home system may also include a user interface engine operative to provide context-sensitive features and overlays intelligently integrated with the underlying content and adaptive to the viewing environment. A family of remote control and other input/output device may also be incorporated into the digital home system in various embodiments to further enhance the intuitive user interactions, ease of use and overall quality of the system. The embodiments are not limited in this context.

Various embodiments are directed to streaming DVR devices that can communicate over an Internet Protocol (IP) network such as, for instance, the Internet with other streaming enabled DVR devices. Implementing a peer-to-peer type connection, one streaming enabled DVR may be able to stream buffered video data to another streaming enabled DVR. As a result, the embodiments can improve affordability, scalability, modularity, extendibility, or interoperability for an operator, device or network.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a block diagram for a media processing system 100. The media processing system 100 is generally directed to performing media processing operations for media content in accordance with any associated control signaling necessary for presenting media content on an output device. In one embodiment, the media processing system 100 is particularly arranged to provide media content from disparate media sources to viewers in a home environment, such as a digital home system, for example. However, the media processing system 100 may be suitable for any use scenarios involving presentation and display of media content. Although the media processing system 100 shown in FIG. 1 has a limited number of elements in a certain topology, it may be appreciated that the media processing system 100 may include more or less elements in alternate topologies as desired for a given implementation. The embodiments are not limited in this context.

In various embodiments, various elements of the media processing system 100 may communicate, manage, or process information in accordance with one or more protocols. A protocol may comprise a set of predefined rules or instructions for managing communication among nodes. A protocol may be defined by one or more standards as promulgated by a standards organization, such as, the International Telecommunications Union (ITU), the International Organization for Standardization (ISO), the International Electrotechnical Commission (IEC), the Institute of Electrical and Electronics Engineers (IEEE), the Internet Engineering Task Force (IETF), the Motion Picture Experts Group (MPEG), and so forth. For example, the described embodiments may be arranged to operate in accordance with standards for media processing, such as the National Television Systems Committee (NTSC) standards, the Advanced Television Systems Committee (ATSC) standards, the Phase Alteration by Line (PAL) standards, the MPEG-1 standard, the MPEG-2 standard, the MPEG-4 standard, the Open Cable standard, the Society of Motion Picture and Television Engineers (SMPTE) Video-Codec (VC-1) standards, the ITU/IEC H.263 and H.264 standards, and others. Another example may include various Digital Video Broadcasting (DVB) standards, such as the Digital Video Broadcasting Terrestrial (DVB-T) broadcasting standard, the DVB Satellite (DVB-S) broadcasting standard, the DVB Cable (DVB-C) broadcasting standard, and others. Digital Video Broadcasting (DVB) is a suite of internationally accepted open standards for digital television. DVB standards are maintained by the DVB Project, an international industry consortium, and they are published by a Joint Technical Committee (JTC) of European Telecommunications Standards Institute (ETSI), European Committee for Electrotechnical Standardization (CENELEC) and European Broadcasting Union (EBU). The embodiments are not limited in this context.

In various embodiments, elements of the media processing system 100 may be arranged to communicate, manage or process different types of information, such as media information and control information. Examples of media information may generally include any data or signals representing multimedia content meant for a user, such as media content, voice information, video information, audio information, image information, textual information, numerical information, alphanumeric symbols, graphics, and so forth. Control information may refer to any data or signals representing commands, instructions, control directives or control words meant for an automated system. For example, control information may be used to route media information through a system, to establish a connection between devices, instruct a device to process the media information in a predetermined manner, monitor or communicate status, perform synchronization, and so forth. The embodiments are not limited in this context.

In various embodiments, media processing system 100 may be implemented as a wired communication system, a wireless communication system, or a combination of both. Although media processing system 100 may be illustrated using a particular communications media by way of example, it may be appreciated that the principles and techniques discussed herein may be implemented using any type of communication media and accompanying technology. The embodiments are not limited in this context.

When implemented as a wired system, for example, the media processing system 100 may include one or more elements arranged to communicate information over one or more wired communications media. Examples of wired communications media may include a wire, cable, printed circuit board (PCB), backplane, switch fabric, semiconductor material, twisted-pair wire, co-axial cable, fiber optics, and so forth. The wired communications media may be connected to a device using an input/output (I/O) adapter. The I/O adapter may be arranged to operate with any suitable technique for controlling information signals between elements using a desired set of communications protocols, services or operating procedures. The I/O adapter may also include the appropriate physical connectors to connect the I/O adapter with a corresponding communications medium. Examples of an I/O adapter may include a network interface, a network interface card (NIC), disc controller, video controller, audio controller, and so forth. The embodiments are not limited in this context.

When implemented as a wireless system, for example, the media processing system 100 may include one or more wireless elements arranged to communicate information over one or more types of wireless communication media. An example of wireless communication media may include portions of a wireless spectrum, such as the RF spectrum. The wireless elements may include components and interfaces suitable for communicating information signals over the designated wireless spectrum, such as one or more antennas, wireless transmitters, receiver, transmitters/receivers ("transceivers"), amplifiers, filters, control logic, antennas, and so forth. The embodiments are not limited in this context.

In the illustrated embodiment shown in FIG. 1, the media processing system 100 may comprise a media processing device 110. The media processing device 110 may be communicatively coupled with one or more input devices 102-a, one or more output devices 104-b, one or more media sources 106-c, and a communications network such as the Internet 150. The media processing device 110 may be communicatively coupled to the input devices 102-a, the output devices 104-b, the media sources 106-c, and the Internet 150 via respective wireless or wired communications connections 108-d, 110-e and 112-f.

It is worthy to note that "a" and "b" and "c" and "d" and similar designators as used herein are intended to be variables representing any positive integer. Thus, for example, if an implementation sets a value for a=5, then a complete set of input devices 102-a may include computing devices 102-1, 102-2, 102-3, 102-4 and 102-5. The embodiments are not limited in this context.

In various embodiments, the media processing system 100 may include one or more input devices 102-a. In general, each input device 102-a may comprise any component or device capable of providing information to the media processing device 110. Examples of input devices 102-a may include without limitation remote control devices, pointing devices, keyboards, keypads, trackballs, trackpads, touchscreens, joysticks, game controllers, sensors, biometric sensors, thermal sensors, motion sensors, directional sensors, microphones, microphone arrays, video cameras, video camera arrays, global positioning system devices, mobile computing devices, laptop computers, desktop computers, handheld computing devices, tablet computing devices, netbook computing devices, smart phones, cellular telephones, wearable computers, and so forth. The embodiments are not limited in this context.

In various embodiments, the media processing system 100 may include one or more output devices 104-b. An output device 104-b may comprise any electronic device capable of reproducing, rendering or presenting media content for consumption by a human being. Examples of output devices 104-b may include without limitation a display, an analog display, a digital display, a television display, audio speakers, headphones, a printing device, lighting systems, warning systems, mobile computing devices, laptop computers, desktop computers, handheld computing devices, tablet computing devices, netbook computing devices and so forth. The embodiments are not limited in this context.

While various embodiments refer to input devices 102-a providing information to media processing device 110 and output devices 104-b receiving information from media processing device, it should be understood that one or more of the input devices 102-a and output device 104-b may allow for the exchange of information to and from media processing device 110 via their respectively connections 108-d and 110-e. For example, one or more of input devices 102-a may be operative to provide information to media processing device 110 and to receive information from media processing device 110. In various embodiments, one or more of output devices 104-b may be operative to receive information from media processing device 110 and may also be operative to provide information to media processing device 110. Similarly, there may be a bi-directional exchange between the media processing device 110 and media sources 106-c. For instance, a media source 106-c may be operative to provide media information to the media processing device 110 and to receive information from the media processing device 110. An example of this would be a video on demand (VOD) application implemented by the media processing device 110. The embodiments are not limited in this context.

In one embodiment, for example, the media processing system 100 may include a display 104-1. The display 104-1 may comprise any analog or digital display capable of presenting media information received from media sources 106-c. The display 104-1 may display the media information at a defined format resolution. In various embodiments, for example, the incoming video signals received from media sources 106-c may have a native format, sometimes referred to as a visual resolution format. Examples of a visual resolution format include a digital television (DTV) format, high definition television (HDTV), progressive format, computer display formats, and so forth. For example, the media information may be encoded with a vertical resolution format ranging between 480 visible lines per frame to 1080 visible lines per frame, and a horizontal resolution format ranging between 640 visible pixels per line to 1920 visible pixels per line. In one embodiment, for example, the media information may be encoded in an HDTV video signal having a visual resolution format of 720 progressive (720p), which refers to 720 vertical pixels and 1280 horizontal pixels (720×1280). In another example, the media information may have a visual resolution format corresponding to various computer display formats, such as a video graphics array (VGA) format resolution (640×480), an extended graphics array (XGA) format resolution (1024×768), a super XGA (SXGA) format resolution (1280×1024), an ultra XGA (UXGA) format resolution (1600×1200), and so forth. The embodiments are not limited in this context. The type of displays and format resolutions may vary in accordance with a given set of design or performance constraints, and the embodiments are not limited in this context.

In various embodiments, the media processing system 100 may include one or more media sources 106-c. Media sources 106-c may comprise any media source capable of sourcing or delivering media information and/or control information to media processing device 110. More particularly, media sources 106-c may comprise any media source capable of sourcing or delivering digital audio and/or video (AV) signals to media processing device 110. Examples of media sources 106-c may include any hardware or software element capable of storing and/or delivering media information, such as a digital video recorder (DVR), a personal video recorder (PVR), a digital versatile disc (DVD) device, a video home system (VHS) device, a digital VHS device, a disk drive, a hard drive, an optical disc drive a universal serial bus (USB) flash drive, a memory card, a secure digital (SD) memory card, a mass storage device, a flash drive, a computer, a gaming console, a compact disc (CD) player, computer-readable or machine-readable memory, a digital camera, camcorder, video surveillance system, teleconferencing system, telephone system, medical and measuring instruments, scanner system, copier system, television system, digital television system, set top boxes, personal video records, server systems, computer systems, personal computer systems, smart phones, tablets, notebooks, handheld computers, wearable computers, portable media players (PMP), portable media recorders (PMR), digital audio devices (e.g., MP3 players), digital media servers and so forth. Other examples of media sources 106-c may include media distribution systems to provide broadcast or streaming analog or digital AV signals to media processing device 110. Examples of media distribution systems may include, for example, Over The Air (OTA) broadcast systems, terrestrial cable systems (CATV), satellite broadcast systems, and so forth. It is worthy to note that media sources 106-c may be internal or external to media processing device 110, depending upon a given implementation. The embodiments are not limited in this context.

In various embodiments, the media processing system 100 may specifically include a streaming enabled DVR device 106-dvr as a media source 106-c. In one embodiment, the streaming enabled DVR device 106-dvr is implemented as a local streaming enabled DVR device 106-dvr that is geographically co-located with the media processing device 110, such as within a same home or office, for example. The streaming enabled DVR device 106-dvr may be communicatively coupled to the Internet 150 via an Internet Protocol (IP) network connectivity interface. The Internet 150 may also be communicatively coupled with multiple other streaming enabled DVR devices 160-z, two examples of which are shown in FIG. 1 as streaming enabled DVR devices 160-1, 160-2. In one embodiment, the streaming enabled DVR devices 160-1, 160-2 may be implemented as remote streaming enabled devices 160-1, 160-2 that are geographically separate from the media processing device 110, such as in a different home or office, for example. The streaming enabled DVR device 106-dvr may be able to send and/or receive streaming video data over the Internet 150 using a peer-to-peer networking connection with another streaming enabled DVR device 160-1 provided the other streaming enabled DVR device 160-1 is also communicatively coupled with the Internet 150.

In one embodiment, for example, a streaming enabled DVR device 106-dvr may comprise a processing component or logic device, similar to the processing component 112 implemented for the media processing device 110, with suitable control hardware or software arranged to receive a control directive sent from an input device 102-1, such as a remote control device. The streaming enabled DVR device 106-dvr may initiate a peer-to-peer connection with a similarly networked streaming enabled DVR device 160-1. Once a peer-to-peer connection has been established, buffered program data from one streaming enabled DVR device may be sent to the other streaming enabled DVR device over the Internet 150.

In various embodiments, the media processing system 100 may include one or more media processing devices 110. The media processing device 110 may comprise any electronic device arranged to receive, process, manage, and/or present media information received from media sources 106-c. In general, the media processing device 110 may include, among other elements, a processing system, a processing sub-system, a processor, a computer, a device, an encoder, a decoder, a coder/decoder (codec), a filtering device (e.g., graphic scaling device, deblocking filtering device), a transformation device, an entertainment system, a display, or any other processing or communications architecture. The embodiments are not limited in this context.

The media processing device 110 may execute processing operations or logic for the media processing system 100 using a processing component 112. The processing component 112 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The media processing device 110 may also include a streaming component 114. Via the media processing device 110 communications component 120, the streaming component 114 may be communicatively coupled to the Internet 150. The Internet 150 may also be communicatively coupled with multiple other streaming enabled DVR devices 160-1, 160-2. The media processing device 110 may be able to send and/or receive streaming video data over the Internet 150 using a peer-to-peer networking connection with a streaming enabled DVR device 160-1 provided the other streaming enabled DVR device 160-1 is also communicatively coupled with the Internet 150.

In one embodiment, the processing component 112 may optionally implement a streaming component 114. The streaming component 114 may perform operations similar to those performed by a streaming enabled DVR device 106-dvr. In one embodiment, the streaming component 114 may operate to perform all streaming operations for the media processing system 100. In one embodiment, the streaming component 114 may be disabled or removed thereby leaving streaming operations to be performed by the streaming enabled DVR device 106-dvr. The embodiments are not limited in this context.

The media processing device 110 may execute communications operations or logic for the media processing system 100 using communications component 120. The communications component 120 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 120 may include various types of standard communication elements, such as one or more communications interfaces, network interfaces, network interface cards (NIC), radios, wireless transmitters/receivers (transceivers), wired and/or wireless communication media, infra-red transceivers, serial interfaces, parallel interfaces, bus interfaces, physical connectors, and so forth. By way of example, and not limitation, communication media 120 includes wired communications media and wireless communications media, as previously described.

Figure 2:
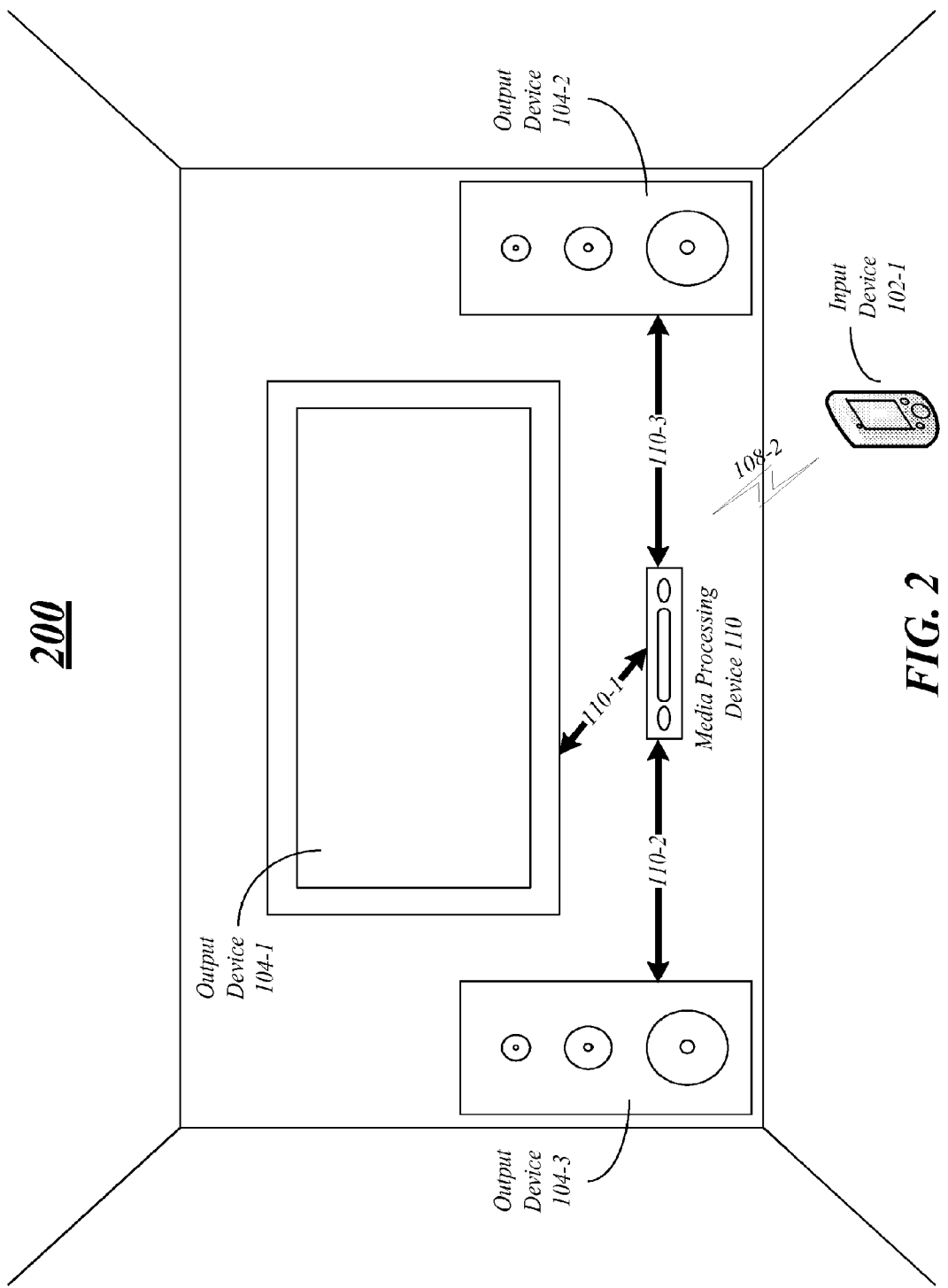
FIG. 2 illustrates one embodiment of a media processing component.

FIG. 2 illustrates a block diagram for a media processing system 200 that may be the same or similar to media processing system 100 of FIG. 1 where like elements are similarly numbered. The media processing system 200 may comprise a sample digital home system implementation that is arranged to provide media content from disparate media sources to viewers in a home, office, or room environment. Although the media processing system 200 shown in FIG. 2 has a limited number of elements in a certain topology, it may be appreciated that the media processing system 200 may include more or less elements in alternate topologies as desired for a given implementation. The embodiments are not limited in this context.

In the illustrated embodiment shown in FIG. 2, the media processing system 200 may comprise a media processing device 110, input device 102-1, output devices 104-1, 104-2 and 104-3, transcoder device 114-1 and one or more media sources 106 (not shown). The media processing device 110 may be communicatively coupled to the input device 102-1, the output devices 104-1, 104-2 and 104-3, transcoder device 114-1 and the media sources 106 via respective wireless or wired communications connections 108-2, 110-1, 110-2 and 110-3. For purposes of illustration, the one or more media sources 106 of FIG. 2 (not shown) are part of, or integrated into, media processing device 110. Other embodiments are described and claimed.

In various embodiments, media processing device 110 may comprise a set-top box, digital media hub, media server, or other suitable processing device arranged to control the digital home system 200. While shown as a separate component in FIG. 2, it should be understood that media processing device 110 may be arranged as part of output device 104-1 or any other suitable component of system 200 in some embodiments. Output device 104-1 may comprise a digital television arranged to display information received from media processing device 110 over connection 110-1 in some embodiments. In various embodiments, output devices 104-2 and 104-3 may comprise speakers arranged to reproduce audio or other acoustic signals received from media processing device 110 over connections 110-2 and 110-3 respectively. Input device 102-1 may comprise a remote control, smart phone, or other suitable processing device capable of communicating with media processing device 110, output device 104-1 or any other device in the digital home system 200. Together, each of the components, nodes or devices of media processing system 200 may form or comprise one example embodiment of digital home entertainment system. The embodiments are not limited to the type, number or arrangement of components illustrated in FIG. 2.

Figure 3:
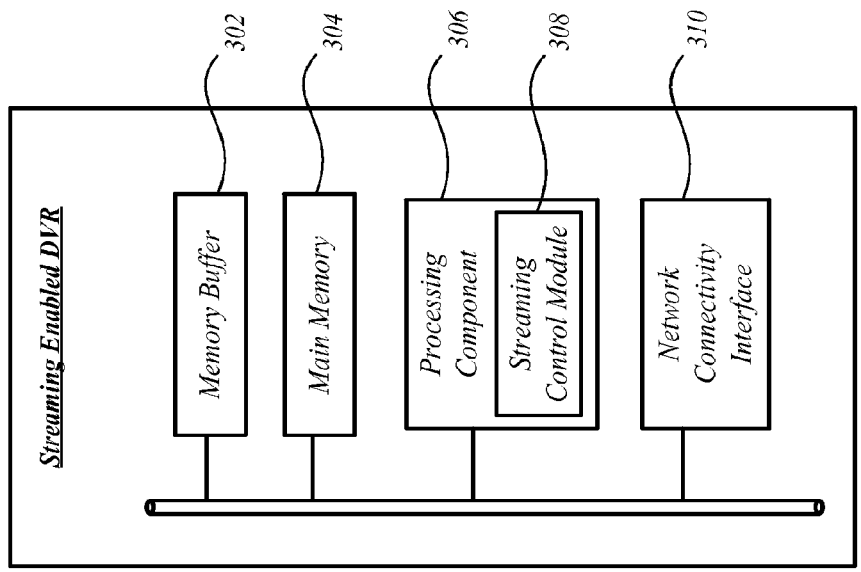
FIG. 3 illustrates one embodiment of a streaming enabled DVR device.

FIG. 3 illustrates one embodiment of a streaming enabled DVR device 106-dvr. In various embodiments, the streaming enabled DVR device 106-dvr may include a memory buffer 302 adapted to store program data on a channel that the streaming enabled DVR device 106-dvr is currently receiving, for example. Typically a streaming enabled DVR device 106-dvr may buffer up to sixty minutes of programming for the channel that is currently tuned. Some DVRs may be capable of tuning multiple channels simultaneously and may also be capable of buffering program data for the multiple channels.

In various embodiments, the streaming enabled DVR device 106-dvr may include a main memory 304 adapted to store entire programs in a semi-permanent state. The stored programs in the main memory 304 represent programs that a user has opted to record and playback at a later time. The main memory 304 is distinguishable from the memory buffer 302 in that the memory buffer 302 is automatically cleared and reset upon tuning to a different channel.

In various embodiments, the streaming enabled DVR device 106-dvr may include a processing component 306 similar to the processing component 112 (of the media processing device), the processing component 306 comprising a one or more processors and one or more memory units arranged to process and store data. The processing component 306 is operative with the memory buffer 302 and main memory 304.

In various embodiments, the processing component 306 may comprise or implement a streaming control module 308. The streaming control module 308 may implement various types of control logic for the streaming enabled DVR device 106-dvr. In one embodiment, for example, the streaming control module 308 may be operative on the processing component 306 (e.g., a processor or other logic device) to receive a control directive sent from a remote control device, send or receive a program request, establish a peer-to-peer connection with another streaming enabled DVR device, send or receive streaming video, and determine when to stop sending or receiving streaming video.

In various embodiments, the streaming enabled DVR device 106-dvr may include an IP network connectivity interface 310 in the form of a wired connection (e.g., Ethernet) or a wireless connection using, for instance, a WiFi wireless transceiver. The IP network connectivity interface is configured to be operative to allow the streaming enabled DVR device 106-dvr to communicate over an IP network, such as the Internet 150, such that streaming video (e.g., program data) may be received and sent by the streaming enabled DVR device 106-dvr over the IP network.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
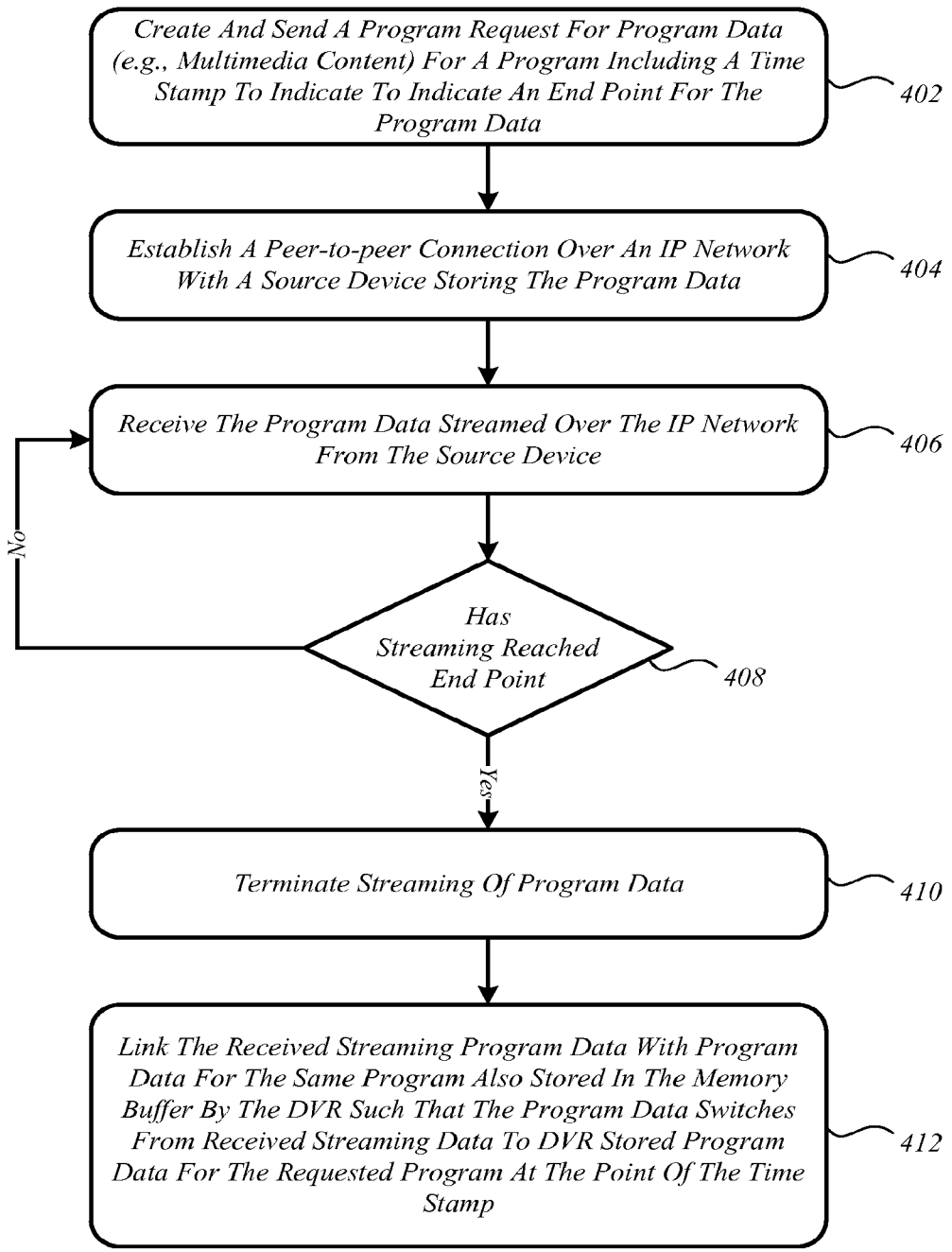
FIG. 4 illustrates one embodiment of a logic flow.

FIG. 4 illustrates one embodiment of a logic flow 400 in which a local streaming enabled DVR device 160-dvr receives program data from one or more remote streaming enabled DVR devices 160-1, 160-2 (e.g., a source device). With reference to FIG. 4, streaming enabled DVR device 106-dvr is termed the requesting streaming enabled DVR device 106-dvr because it is the device that is seeking program data from a remote streaming enabled DVR device (e.g., 160-1, 160-2) acting as a source streaming enabled DVR device. The logic flow 400 may be representative of some or all of the operations executed by one or more embodiments described herein. The term program may represent broadcast audio/video content associated with a particular channel or network that is airing at a particular time which is capable of being buffered by a DVR device. The term program data may represent the multimedia content comprising the program.

In a typical scenario, a user may tune the media processing device 110 to a particular channel to watch a desired program. A streaming enabled DVR device 106-dvr communicatively coupled with the media processing device 110 may begin buffering the program data (e.g., multimedia content) from that point forward. Unfortunately, the user may not have tuned in early enough to see the beginning of the program. Perhaps the program began airing at 8:00 PM but the user was not able to tune in until 8:10 PM. As previously discussed, DVR devices such as streaming enabled DVR 106-dvr, typically buffer up to an hour of programming for the channel currently tuned. However, assume that the DVR device buffers programming from a different channel other than the current channel to which the media processing device 110 has been recently tuned. In this scenario, the user can only enjoy the program from the ten minute point onward since the first ten minutes are not buffered in the DVR memory buffer.

In various embodiments, the user may be able to obtain the missing ten minutes of the program from another streaming enabled DVR device, such as the remote streaming enabled DVR device 160-1 or 160-2, that was tuned to the channel and did buffer the program data. If the media processing device 110 is communicable with the remote streaming enabled DVR devices 160-1, 160-2 then these remote devices can stream program data to the media processing component 110. In one embodiment, for example, streaming operations may be performed using a peer-to-peer type connection. Since only the first ten minutes of program data is needed by the user in this example streaming operations and bandwidth overhead may be kept at a minimum.

In the illustrated embodiment shown in FIG. 4, a requesting streaming enabled DVR device 106-dvr may create and send a program request for program data for a program including a time stamp to indicate an end point for the program data at block 402. For example, a program request may comprise a title, time, and channel that comprises a program. The program request may be sent to a specific device such as a remote streaming enabled DVR device 160-1 or to a central location 170 that can act as a clearinghouse for similar requests. In the clearinghouse model, multiple streaming enabled DVR devices 106-dvr, 160-1, 160-2 (e.g., source devices) voluntarily report the programs that they are currently buffering to the central location 170 which may be for instance, a web-site or data server. The central location 170 keeps a record of the various programs being buffered by the various streaming enabled DVR devices 106-dvr, 160-1, 160-2 perhaps associating an IP address with each. When a program request is received at the central location 170 an acknowledgement message may be returned to the requesting streaming enabled DVR device 106-dvr with the IP address of a remote streaming enabled DVR device (e.g., 160-1) capable of sending the requested program data. This remote streaming enabled DVR device becomes the source streaming enabled DVR device 160-1. The embodiments are not limited to this example.

The logic flow 400 may establish a peer-to-peer connection over an IP network with the source streaming enabled DVR device 160-1 storing the program data at block 404. For example, the requesting streaming enabled DVR device 106-dvr may utilize the IP address from an acknowledgement message to initiate contact with the source streaming enabled DVR device 160-1 to create a peer-to-peer connection between the requesting streaming enabled DVR device 106-dvr and the source streaming enabled DVR device 160-1 over an IP network, such as the Internet 150. The embodiments are not limited to this example.

The logic flow 400 may receive the program data streamed over the IP network from the source device at block 406. For example, the requesting streaming enabled DVR device 106-dvr may receive the requested program data being streamed from the source streaming enabled DVR device 160-1 over the peer-to-peer connection. The streamed program data may then be stored in the requesting streaming enabled DVR device 106-dvr memory buffer 302. The embodiments are not limited to this example.

The logic flow 400 may determine if the program data being streamed has reached its end point at block 408. For example, the requesting streaming enabled DVR device 106-dvr may terminate the peer-to-peer connection once the streamed program data has reached the point where the requesting streaming enabled DVR device 106-dvr began buffering the program data itself (e.g., the ten minute mark from the example above). The embodiments are not limited to this example.

If the program data being streamed has reached its end point, the logic flow 400 may determine that streaming has been terminated at block 410. For example, the source streaming enabled DVR device 106-1 may terminate the peer-to-peer connection once the streamed program data has reached the end point associated with the time stamp data in the program request. This ensures that only the portion of the program data that was missing is streamed. The requesting streaming enabled DVR device 106-dvr may detect the termination of the peer-to-peer connection and finish writing the streamed program data to the memory buffer 302. The embodiments are not limited to this example.

The logic flow 400 may link the received streamed program data with program data for the same program also stored in the memory buffer 302 by the requesting streaming enabled DVR 106-dvr such that the program data switches from received streamed data to the requesting streaming enabled DVR device 106-dvr stored program data at the point of the time stamp at block 412. For example, the requesting streaming enabled DVR 106-dvr may link the received streaming program data stored in the memory buffer 302 with program data for the same program also stored in the memory buffer 302, wherein the requesting streaming enabled DVR device 106-dvr is configured to store the program data for the same program beginning at the time stamp point such that, when the program data is played back, the program data switches from received streamed data for the requested program to the locally stored program data at the point of the time stamp. The embodiments are not limited to this example.

Figure 4A:
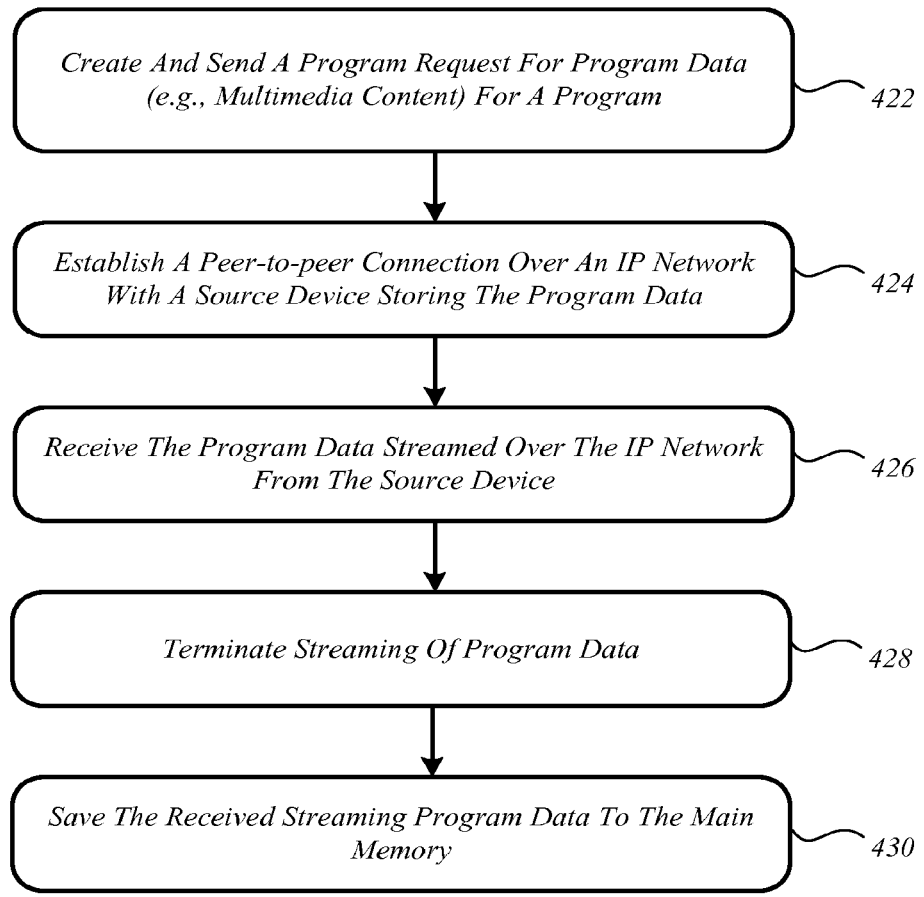
FIG. 4A illustrates one embodiment of a logic flow.

FIG. 4A illustrates one embodiment of a logic flow 420 in which a local streaming enabled DVR device 160-dvr receives program data for a complete program from one or more remote streaming enabled DVR devices 160-1, 160-2 (e.g., a source device). With reference to FIG. 4A, streaming enabled DVR device 106-dvr is termed the requesting streaming enabled DVR device 106-dvr because it is the device that is seeking program data from a remote streaming enabled DVR device (e.g., 160-1, 160-2) acting as a source streaming enabled DVR device. The logic flow 420 may be representative of some or all of the operations executed by one or more embodiments described herein. The term program may represent broadcast audio/video content associated with a particular channel or network that has been stored by a DVR device. The term program data may represent the multimedia content comprising the program.

In various embodiments, the user may be able to obtain a desired program from another streaming enabled DVR device, such as the remote streaming enabled DVR device 160-1 or 160-2. If the media processing device 110 is communicable with the remote streaming enabled DVR devices 160-1, 160-2 then these remote devices can stream program data to the media processing component 110. In one embodiment, for example, streaming operations may be performed using a peer-to-peer type connection.

In the illustrated embodiment shown in FIG. 4, a requesting streaming enabled DVR device 106-dvr may create and send a program request for program data for a program at block 422. For example, a program request may comprise a title, time, and channel that comprises a program. The program request may be sent to a specific device such as a remote streaming enabled DVR device 160-1 or to a central location 170 that can act as a clearinghouse for similar requests. In the clearinghouse model, multiple streaming enabled DVR devices 106-dvr, 160-1, 160-2 (e.g., source devices) voluntarily report the programs that they currently have stored in main memory 304 to the central location 170 which may be for instance, a web-site or data server. The central location 170 keeps a record of the various programs stored by the various streaming enabled DVR devices 106-dvr, 160-1, 160-2 perhaps associating an IP address with each. When a program request is received at the central location 170 an acknowledgement message may be returned to the requesting streaming enabled DVR device 106-dvr with the IP address of a remote streaming enabled DVR device (e.g., 160-1) capable of sending the requested program data. This remote streaming enabled DVR device becomes the source streaming enabled DVR device 160-1. The embodiments are not limited to this example.

The logic flow 420 may establish a peer-to-peer connection over an IP network with the source streaming enabled DVR device 160-1 storing the program data at block 424. For example, the requesting streaming enabled DVR device 106-dvr may utilize the IP address from an acknowledgement message to initiate contact with the source streaming enabled DVR device 160-1 to create a peer-to-peer connection between the requesting streaming enabled DVR device 106-dvr and the source streaming enabled DVR device 160-1 over an IP network, such as the Internet 150. The embodiments are not limited to this example.

The logic flow 420 may receive the program data streamed over the IP network from the source device at block 426. For example, the requesting streaming enabled DVR device 106-dvr may receive the requested program data being streamed from the source streaming enabled DVR device 160-1 over the peer-to-peer connection. The streamed program data may then be stored in the requesting streaming enabled DVR device 106-dvr main memory buffer 304. The embodiments are not limited to this example.

Figure 5:
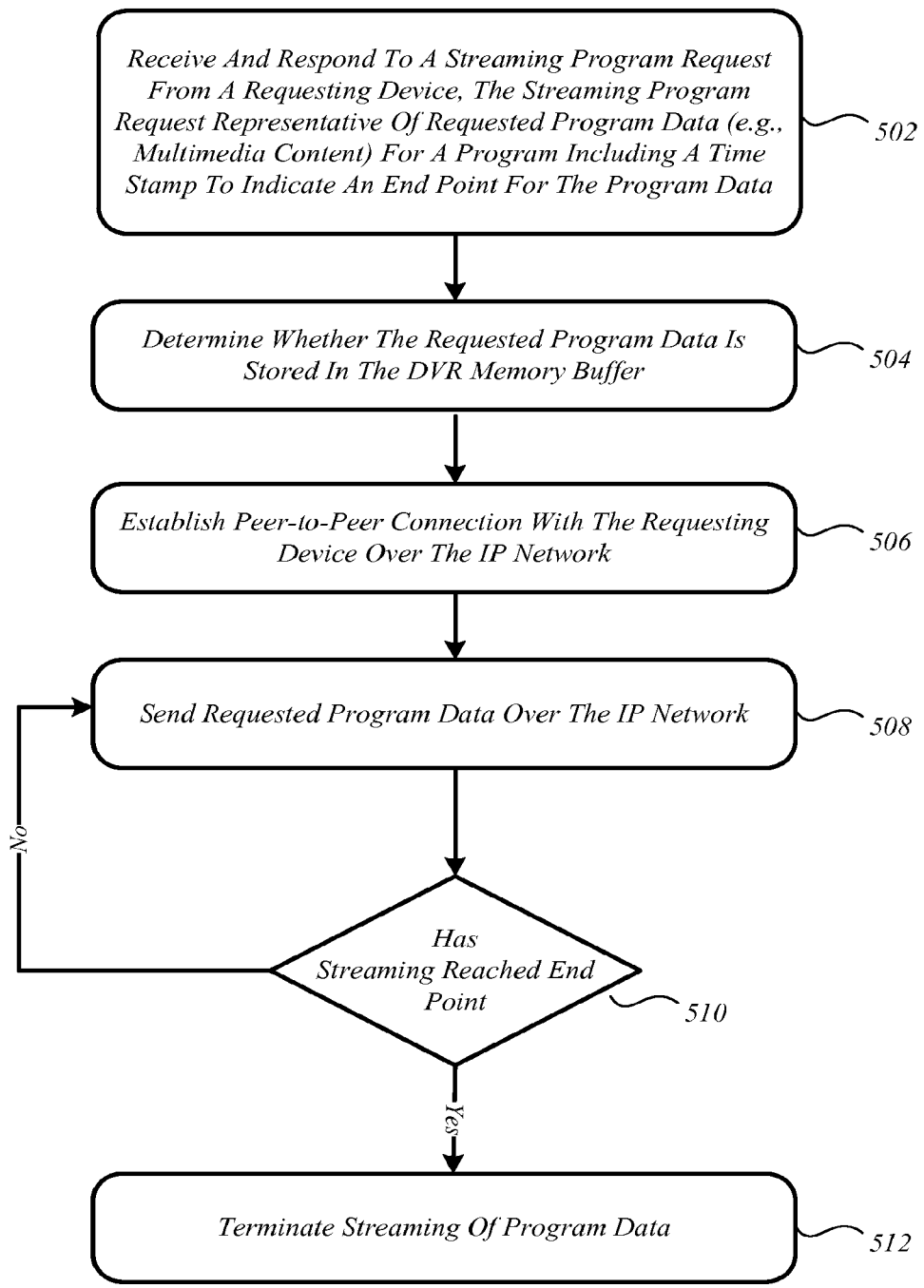
FIG. 5 illustrates one embodiment of a logic flow.

FIG. 5 illustrates one embodiment of a logic flow 500 in which a streaming enabled DVR device 106-dvr sends program data to a remote streaming enabled DVR device (e.g., requesting device). With reference to FIG. 5, streaming enabled DVR device 106-dvr is now termed the source streaming enabled DVR device 106-dvr because it is the device that is sending program data to a remote requesting streaming enabled DVR device (e.g., 160-1, 160-2). The logic flow 500 may be representative of some or all of the operations executed by one or more embodiments described herein.

In the illustrated embodiment shown in FIG. 5, the logic flow 500 may receive and respond to a streaming program request from a requesting streaming enabled DVR device 160-1, the streaming program request representative of requested program data for a program including a time stamp to indicate an end point for the program data at block 502. For example, a program request may comprise a title, time, and channel that comprises a program. The program request may be received from a remote requesting streaming enabled DVR device 160-1 or from a central location 170 that can act as a clearinghouse for similar requests. If the program request is received directly from a requesting streaming enabled DVR device 160-1, source streaming enabled DVR device 106-dvr can return an acknowledgement message indicating whether the requested program data is available for streaming from source streaming enabled DVR device 106-dvr.

In the clearinghouse model, multiple streaming enabled DVR devices 106-dvr, 160-1, 160-2 (e.g., source devices) voluntarily report the programs that they are currently buffering to the central location 170 which may be for instance, a web-site or data server. The central location 170 keeps a record of the various programs being buffered by the various streaming enabled DVR devices 106-dvr, 160-1, 160-2 perhaps associating an IP address with each. When a program request is received at the central location 170 an acknowledgement message may be returned to the requesting streaming enabled DVR device 160-1 with the IP address of a source streaming enabled DVR device (e.g., 106-dvr) capable of sending the requested program data. The embodiments are not limited to this example.

The logic flow 500 may determine whether the requested program data is stored in the memory buffer 302 of source streaming enabled DVR device 106-dvr at block 504. For example, source streaming enabled DVR device 106-dvr can verify that the requested program data is indeed being currently buffered to the memory buffer 302 and would be available to stream. The embodiments are not limited to this example.

The logic flow 500 may establish a peer-to-peer connection over an IP network 150 with the requesting streaming enabled DVR device 160-1 at block 506. For example, this may be done in a manner similar to that described above with respect to block 404 of FIG. 4. The embodiments are not limited to this example.

The logic flow 500 may send (e.g. stream) the requested program data over the IP network to the requesting streaming enabled DVR device 160-1 at block 508. For example, source streaming enabled DVR device 106-dvr may initiate a video streaming process that reads the memory buffer 302 and packages the requested program data such that it can be streamed by source streaming enabled DVR device 106-dvr over the IP network (e.g., Internet 150). The embodiments are not limited to this example.

The logic flow 500 may determine if the program data being streamed has reached its end point at block 510. For example, the program request included a time stamp. The time stamp indicates the point at which the requesting streaming enabled DVR device 106-1 started buffering the program data itself. Thus, source streaming enabled DVR device 106-dvr need only stream the requested program data from its beginning point to the point associated with the time stamp. The embodiments are not limited to this example.

If the program data being streamed has reached its end point, the logic flow 500 may terminate streaming the requested program data at block 512. For example, source streaming enabled DVR device 106-dvr may terminate the peer-to-peer connection once the streamed program data has reached the end point associated with the time stamp data in the program request. The embodiments are not limited to this example.

Figure 5A:
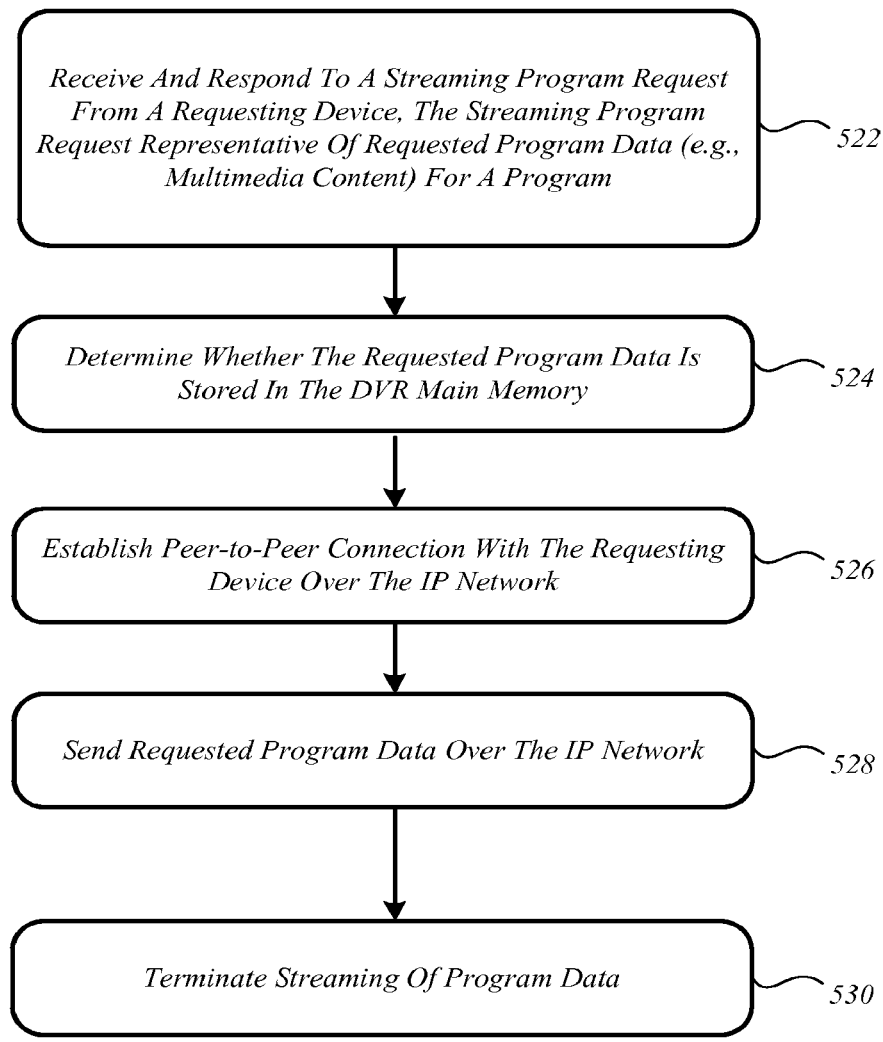
FIG. 5A illustrates one embodiment of a logic flow.

FIG. 5A illustrates one embodiment of a logic flow 520 in which a streaming enabled DVR device 106-dvr sends program data to a remote streaming enabled DVR device (e.g., requesting device). With reference to FIG. 5A, streaming enabled DVR device 106-dvr is now termed the source streaming enabled DVR device 106-dvr because it is the device that is sending program data to a remote requesting streaming enabled DVR device (e.g., 160-1, 160-2). The logic flow 520 may be representative of some or all of the operations executed by one or more embodiments described herein.

In the illustrated embodiment shown in FIG. 5, the logic flow 520 may receive and respond to a streaming program request from a requesting streaming enabled DVR device 160-1, the streaming program request representative of requested program data for a program at block 522. For example, a program request may comprise a title, time, and channel that comprises a program. The program request may be received from a remote requesting streaming enabled DVR device 160-1 or from a central location 170 that can act as a clearinghouse for similar requests. If the program request is received directly from a requesting streaming enabled DVR device 160-1, source streaming enabled DVR device 106-dvr can return an acknowledgement message indicating whether the requested program data is available for streaming from source streaming enabled DVR device 106-dvr.

In the clearinghouse model, multiple streaming enabled DVR devices 106-dvr, 160-1, 160-2 (e.g., source devices) voluntarily report the programs that they have stored to the central location 170 which may be for instance, a web-site or data server. The central location 170 keeps a record of the various programs stored by the various streaming enabled DVR devices 106-dvr, 160-1, 160-2 perhaps associating an IP address with each. When a program request is received at the central location 170 an acknowledgement message may be returned to the requesting streaming enabled DVR device 160-1 with the IP address of a source streaming enabled DVR device (e.g., 106-dvr) capable of sending the requested program data. The embodiments are not limited to this example.

The logic flow 520 may determine whether the requested program data is stored in the main memory 304 of source streaming enabled DVR device 106-dvr at block 504. For example, source streaming enabled DVR device 106-dvr can verify that the requested program data is indeed being currently stored in the main memory 304 and would be available to stream. The embodiments are not limited to this example.

The logic flow 520 may establish a peer-to-peer connection over an IP network 150 with the requesting streaming enabled DVR device 160-1 at block 526. For example, this may be done in a manner similar to that described above with respect to block 404 of FIG. 4. The embodiments are not limited to this example.

The logic flow 520 may send (e.g. stream) the requested program data over the IP network to the requesting streaming enabled DVR device 160-1 at block 528. For example, source streaming enabled DVR device 106-dvr may initiate a video streaming process that reads the main memory 304 and packages the requested program data such that it can be streamed by source streaming enabled DVR device 106-dvr over the IP network (e.g., Internet 150). The embodiments are not limited to this example.

The logic flow 520 may determine if the program data being streamed has reached its end point at block 530. For example, the source streaming enabled DVR device 106-dvr may terminate the peer-to-peer connection once the streamed program data has reached the end point associated with the end of the requested program. The embodiments are not limited to this example.

In various other embodiments, the media processing device 110 of FIG. 1 may act as an intermediary between two streaming enabled DVR devices (e.g., 106-dvr, 160-1). In such an embodiment, on the receiving side, the media processing device 110 may be responsible for creating and sending a program request for program data for a program including a time stamp to indicate an end point for the program data to a remote source streaming enabled DVR such as 160-1, for example. The media processing device 110 may be further responsible for establishing a peer-to-peer networking connection with the source streaming enabled DVR 160-1. The media processing device 110 may then receive the streamed program data from the source streaming enabled DVR device 160-1. Thus, media processing device 110 may be configured to perform the operations set out in blocks 402, 404, and 406 of FIG. 4. The media processing device 110 may forward the received streamed program data to the locally connected streaming enabled DVR device 106-dvr where it can be linked with program data for the same program that has already been buffered as of the time since the time stamp indicator.

Figure 6:
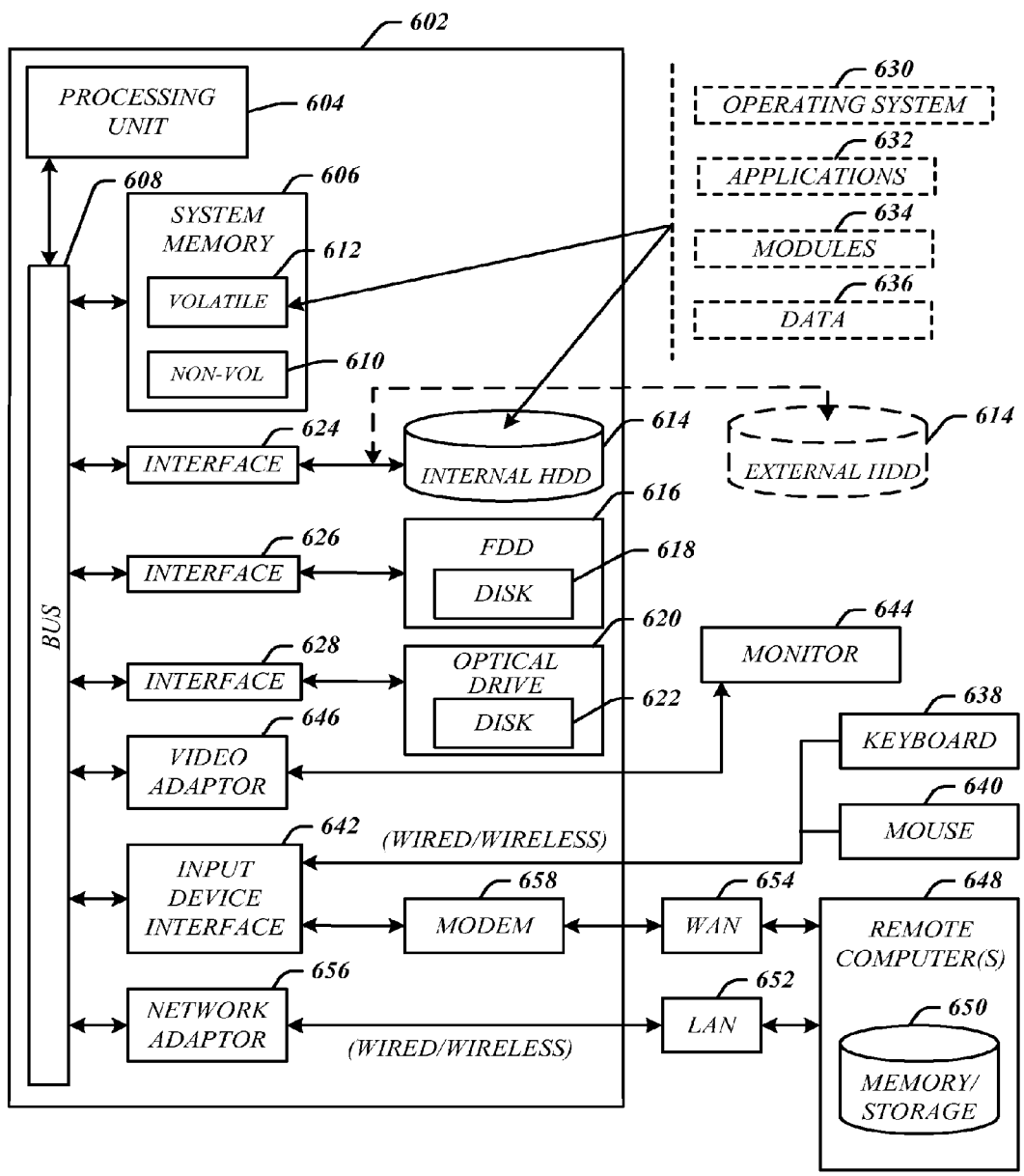
FIG. 6 illustrates one embodiment of a computing architecture.

In a similar fashion on the send side, the media processing device 110 may assume the responsibilities of receiving and processing a program request, establishing a peer-to-peer networking connection with a remote requesting streaming enabled DVR device (e.g., 160-1), retrieving the buffered program data from the local DVR device, and streaming it to the requesting streaming enabled DVR device 160-1. Thus, media processing device 110 may be configured to perform the operations set out in blocks 502, 504, 506, and 508 of FIG. 5. FIG. 6 illustrates an embodiment of an exemplary computing architecture 600 suitable for implementing various embodiments as previously described. As used in this application, the terms "system" and "device" and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 600 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 600 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors. Dual microprocessors and other multi processor architectures may also be employed as the processing unit 604. The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures.

The computing architecture 600 may comprise or implement various articles of manufacture. An article of manufacture may comprise a computer-readable storage medium to store various forms of programming logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of programming logic may include executable computer program instructions implemented using any suitable type of code, such as source code, compiled code, interpreted code, executable code, static code, dynamic code, object-oriented code, visual code, and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636.

A user can enter commands and information into the computer 602 through one or more wire/wireless input devices, for example, a keyboard 638 and a pointing device, such as a mouse 640. Other input devices may include a microphone, an infra-red (IR) remote control, a joystick, a game pad, a stylus pen, touch screen, or the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 7:
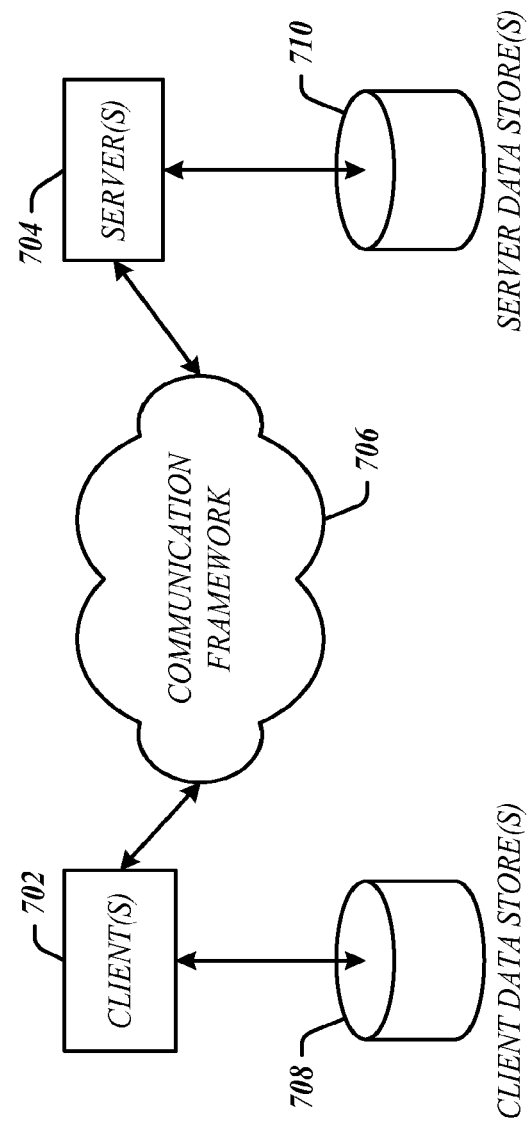
FIG. 7 illustrates one embodiment of a communications architecture.

FIG. 7 illustrates a block diagram of an exemplary communications architecture 700 suitable for implementing various embodiments as previously described. The communications architecture 700 includes various common communications elements, such as a transmitter, receiver, transceiver, radio, network interface, baseband processor, antenna, amplifiers, filters, and so forth. The embodiments, however, are not limited to implementation by the communications architecture 700.

As shown in FIG. 7, the communications architecture 700 comprises includes one or more clients 702 and servers 704. The clients 702 and the servers 704 are operatively connected to one or more respective client data stores 708 and server data stores 710 that can be employed to store information local to the respective clients 702 and servers 704, such as cookies and/or associated contextual information.

The clients 702 and the servers 704 may communicate information between each other using a communication framework 706. The communications framework 706 may implement any well-known communications techniques and protocols, such as those described with reference to systems 100 and 600. The communications framework 706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   a memory buffer;
   a main memory;
   a network connectivity interface; and
   a processing component communicatively coupled to the memory buffer, main memory, and the network connectivity interface, the processing component comprising a streaming control module to:
     send a first program request for multimedia content for a program to a central location device, the first program request comprising a title for the multimedia content, a channel for the multimedia content and a time stamp to indicate an end point of the multimedia content;
     receive a network address of a source streaming enabled digital video recorder (DVR) device from which to request the multimedia content up to the end point indicated by the time stamp;
     send a second program request for the multimedia content to the source streaming enabled DVR device at the network address, the second program request comprising the title for the multimedia content, the channel for the multimedia content and the time stamp;
     receive an acknowledgement indicating that the multimedia content identified in the second program request is available for streaming from the source streaming enabled DVR device;
     establish a peer-to-peer connection over a network with the source streaming enabled DVR device using the network connectivity interface;
     receive the multimedia content streamed over the network from source streaming enabled DVR device using the network connectivity interface;
     determine when the multimedia content streamed over the network reaches a point for the program when the apparatus began buffering multimedia content in the memory buffer; and
     terminate the peer-to-peer connection over the network with the source streaming enabled DVR device based on the determination that the received multimedia content reaches the point for the program when the apparatus began buffering multimedia content in the memory buffer.

2. The apparatus of claim 1, the streaming control module to store the received streamed multimedia content in the memory buffer.

3. The apparatus of claim 1, the streaming control module to store the received streamed multimedia content in the main memory.

4. The apparatus of claim 2, the streaming control module to:
   link the received streaming multimedia content stored in the memory buffer with multimedia content for the same program also stored in the memory buffer, wherein the streaming control module to store the multimedia content for the same program beginning at the time stamp point such that, when the multimedia content is played back, the multimedia content switches from received streaming data for the requested program to the locally stored multimedia content at the point of the time stamp.

5. The apparatus of claim 1, comprising a digital display to present control information for the apparatus.

6. A method, comprising:
   sending a first program request for multimedia content for a program to a central location device, the first program request comprising a title for the multimedia content, a channel for the multimedia content and a time stamp to indicate an end point of the multimedia content;
   receiving a network address of a source streaming enabled digital video recorder (DVR) device from which to request the multimedia content up to the end point indicated by the time stamp;
   sending a second program request for the multimedia content to the source streaming enabled DVR device at the network address, the second program request comprising the title for the multimedia content, the channel for the multimedia content and the time stamp;
   receiving an acknowledgement indicating that the multimedia content identified in the second program request is available for streaming from the source streaming enabled DVR device;

establishing a peer-to-peer connection over an internet protocol (IP) network with the source streaming enabled DVR device;

receiving the multimedia content streamed over the IP network from the source streaming enabled DVR device;

determining when the multimedia content streaming over the IP network reaches a point for the program when a requesting streaming enabled DVR device began buffering multimedia content in a memory buffer; and terminating the peer-to-peer connection over the IP network with the source streaming enabled DVR device based on the determining that the received multimedia content reaches the point for the program when the requesting streaming enabled DVR device began buffering multimedia content in the memory buffer.

7. The method of claim 6, comprising storing the received streamed multimedia content in the memory buffer.

8. The method of claim 6, comprising storing the received streamed multimedia content in a main memory.

9. The method of claim 7, comprising linking the received streaming multimedia content stored in the memory buffer with multimedia content for the same program also stored in the memory buffer that has been stored since the time stamp point such that, when the multimedia content is played back, the multimedia content switches from received streaming data for the requested program to the locally stored multimedia content at the point of the time stamp.

10. An article of manufacture comprising a computer-readable storage medium containing instructions that when executed enable a system to:

send a first program request for multimedia content for a program to a central location device, the first program request comprising a title for the multimedia content, a channel for the multimedia content and a time stamp to indicate an end point of the multimedia content;

receive a network address of a source streaming enabled digital video recorder (DVR) device from which to request the multimedia content up to the end point indicated by the time stamp;

send a second program request for the multimedia content to the source streaming enabled DVR device at the network address, the second program request comprising the title for the multimedia content, the channel for the multimedia content and the time stamp;

receive an acknowledgement indicating that the multimedia content identified in the second program request is available for streaming from the source streaming enabled DVR device;

establish a peer-to-peer connection over an internet protocol (IP) network with the source streaming enabled DVR device;

receive the multimedia content streamed over the IP network from the source streaming enabled DVR device;

determine when the multimedia content streamed over the IP network reaches a point for the program when a requesting streaming enabled DVR device began buffering multimedia content in a memory buffer and terminate the peer-to-peer connection over the IP network with the source streaming enabled DVR device based on the determination that the received multimedia content reached the point for the program when the requesting streaming enabled DVR device began buffering multimedia content in the memory buffer.

11. The article of claim 10, comprising instructions that when executed enable the system to store the received streamed multimedia content in a main memory.

12. The article of claim 10, comprising instructions that when executed enable the system to store the received streamed multimedia content in the memory buffer.

13. The article of claim 12, comprising instructions that when executed enable the system to link the received streaming multimedia content stored in the memory buffer with multimedia content for the same program also stored in the memory buffer, wherein the system is configured to store the multimedia content for the same program beginning at the time stamp point such that, when the multimedia content is played back, the multimedia content switches from received streaming data for the requested program to the locally stored multimedia content at the point of the time stamp.

14. A media processing device comprising:

a communications component communicatively coupled with a digital video recorder (DVR) device, the DVR device configured to store multimedia content for one or more programs;

an Internet Protocol (IP) network connectivity interface; and a processing component communicatively coupled to the communications component and the IP network connectivity interface, the processing component comprising a streaming control module to:

send a first program request for multimedia content for a program to a central location device, the first program request comprising a title for the multimedia content, a channel for the multimedia content and a time stamp to indicate an end point of the multimedia content;

receive a network address of a source streaming enabled digital video recorder (DVR) device from which to request the multimedia content up to the end point indicated by the time stamp;

send a second program request for the multimedia content to the source streaming enabled DVR device at the network address, the second program request comprising the title for the multimedia content, the channel for the multimedia content and the time stamp;

receive an acknowledgement indicating that the multimedia content identified in the second program request is available for streaming from the source streaming enabled DVR device;

establish a peer-to-peer connection over an IP network with the source streaming enabled DVR device;

receive the multimedia content streamed over the IP network from the source streaming enabled DVR device;

determine when the multimedia content streamed over the IP network reaches a point for the program buffered in a memory buffer;

terminate the peer-to-peer connection over the IP network with the source streaming enabled DVR device based on the determination that the received multimedia content reaches the point for the program buffered in the memory buffer; and forward the received multimedia content to the DVR device.

15. The apparatus of claim 1, the streaming control module to detect a termination of the peer-to-peer connection over the network initiated by the source streaming enabled DVR device based on the time stamp to indicate an end point of the multimedia content in the program request.

16. The apparatus of claim 1, comprising the processing circuit to automatically clear the memory buffer upon tuning to a different channel.

* * * * *